United States Patent
Lee et al.

(10) Patent No.: US 6,454,418 B2
(45) Date of Patent: Sep. 24, 2002

(54) PROJECTOR HAVING AN EASY-TO INSTALL LAMP MODULE AND METHOD OF INSTALLATION

(75) Inventors: Sea-Huang Lee; Chang Ting Liu, both of Hsinchu (TW)

(73) Assignee: Optoma Corporation (TW)

( * ) Notice: Subject to any disclaimer, the term of this patent is extended or adjusted under 35 U.S.C. 154(b) by 0 days.

(21) Appl. No.: 09/811,985

(22) Filed: Mar. 19, 2001

(51) Int. Cl.[7] .............................................. G03B 21/20
(52) U.S. Cl. ......................................... 353/87; 353/119
(58) Field of Search ........................... 439/310; 353/87, 353/119, 57

(56) References Cited

U.S. PATENT DOCUMENTS

| | | | | |
|---|---|---|---|---|
| 2,705,437 A | * | 4/1955 | Lessman ..................... | 353/104 |
| 5,287,132 A | * | 2/1994 | Suzuki et al. ............... | 353/119 |
| 5,347,324 A | * | 9/1994 | Sasaki et al. ............... | 348/789 |
| 5,855,488 A | * | 1/1999 | Heintz et al. ............... | 439/310 |

\* cited by examiner

*Primary Examiner*—David M. Gray
*Assistant Examiner*—Michelle Nguyen
(74) *Attorney, Agent, or Firm*—Senniger, Powers, Leavitt & Roedel

(57) ABSTRACT

A projector having a first housing, a second housing, a projector mainframe, a lamp module and a connector pair is disclosed. The removabl lamp module is installed in the first housing which forms part of the projector housing. The projector mainframe is enclosed in the second housing which forms the other part of the projector housing. The connector pair comprises a first half connector and a second half connector, which can be fixed to or separated from each other. The first half connector connected to the lamp module is movable with respect to the second half connector fixed to the projector mainframe. When the first and second half connector are mechanically coupled, the lamp module is then mechanically coupled with the projector mainframe such that the projector can be successfully assembled. As an actuating element fixed to the lamp module activates a switch button installed in the projector mainframe, the electrical connection between the lamp module and the projector mainframe can be established simultaneously with their mechanical coupling. The actuating element and the switch button constitute an interlock switch for the projector of the invention. On the other hand, when the first and second half connector are mechanically decoupled, the lamp module can then be mechanically decoupled and simultaneously disconnected electrically from the projector mainframe. A method of safely installing the lamp module into the projector mainframe or removing the lamp module from the projector mainframe is also disclosed. The method achieves the mechanical coupling or decoupling and the electrical connection or disconnection for the lamp module and the projector mainframe, via the interlock switch.

11 Claims, 7 Drawing Sheets

PROJECTOR HAVING AN EASY-TO INSTALL LAMP MODULE AND METHOD OF INSTALLATION

BACKGROUND OF THE INVENTION

1. Field of the Invention

The present invention relates to a projector having an easy-to-install lamp module and a method of installation.

2. Description of the Prior Art

Generally, the lamp modules of optical projectors operate at a voltage greater than 10,000 volts. With such a high electrical voltage, an improper use of the projector, for example, the wrong assembly of a lamp module, may give the operator an electrical shock. Therefore, strict safety requirements for the operation optical projectors become necessary. To meet the safety requirements, convention projectors are designed with structures that can be classified into the following two types.

(1) Mechanical Connection/disconnection Separated from Electrical Connection/disconnection:

In mechanical design, a lamp module of this like the one convention projector is imbedded in a space defined by projector housing, and tightened by the screws and bolts. Inside the projector housing, there is a removable flat cover to facilitate installation of the lamp module and protect the operator form inadvertently touching the lamp module. The lamp module is connected to a first half connector that can be engaged to a second half connector fixed in the mainframe through naked eyes.

To remove the lamp module, the operator must remove the flat cover fixed in the housing by loosening the screws and bolts first, so as to decouple the connector pair, i.e., the first and the second half connector, and then remove the lamp module. To install the lamp module, the operator must screw the lamp module to its position in the projector mainframe, engage the connector pair, and then replace the flat cover.

In electrical connection design, a salient set in the flat cover of this convention projectors and a button switch connecting an AC power source of the projector constitute an interlock switch structure. When replacing the flat cover, the salient of the flat cover is contacted with the button switch and connects the electricity of the power source to the lamp power supply of the projector. When removing the flat cover, the salient of the flat cover is separated from the button switch and disconnects the electricity of the power source to the lamp power supply. In addition, the connector pair constitutes a part of the entire electric circuit of the projector, which is from lamp power supply and the lamp module. Therefore, when removing the lamp module, the flat cover will be removed from the housing at the same time, and the power source is shut down as well. Then, the half connector is decoupled and the entire electric circuit is disconnected. When installing the lamp module, the half connector is coupled first, and then the flat cover is in place to start the power source and connect the entire electric circuit.

The structure of the projector mentioned above is shown in the product model EZPro of the applicant, for reference.

(2) Simultaneous Mechanical and Electrical Connection/disconnection:

U.S. Pat. No. 5,855,488 disclosed a projector structure having a flat cover to cover the lamp module fixed inside the housing. However, the flat cover does not provide the function of interlock switch. The half connector, connecting to the lamp module, and a second half connector, fixed inside the projector, are aligned automatically and coupled or decoupled by a button switch. The connector pair is coupled mechanically; the entire electrical circuit is connected as well. However, in mechanical connection design, the connector pair is decoupled and the entire electrical circuit is disconnected.

In order to remove the lamp module of the convention projector, it is necessary first to remove the flat cover, decouple the connector pair, and loosen screws. Although the conventional projector meets the safety requirements, it is a pains-taking job to install or remove the lamp module. Therefore, it is necessary to provide a projector that meets the safety requirements and has an easy-to-install lamp module.

SUMMARY OF THE INVENTION

An object of the present invention is to provide a projector having an easy-to-install lamp module, which is installed in a lampshade to be a part of the projector housing. The lampshade is fixed on the housing by a single screw.

Another object of the present invention is to provide a method of installing the lamp module into the projector and remove the lamp module from the projector.

The other objects and advantages of the invention are stated and, shown in the following description and the enclosed drawings.

DETAILED DESCRIPTION OF THE INVENTION

Figure 1:
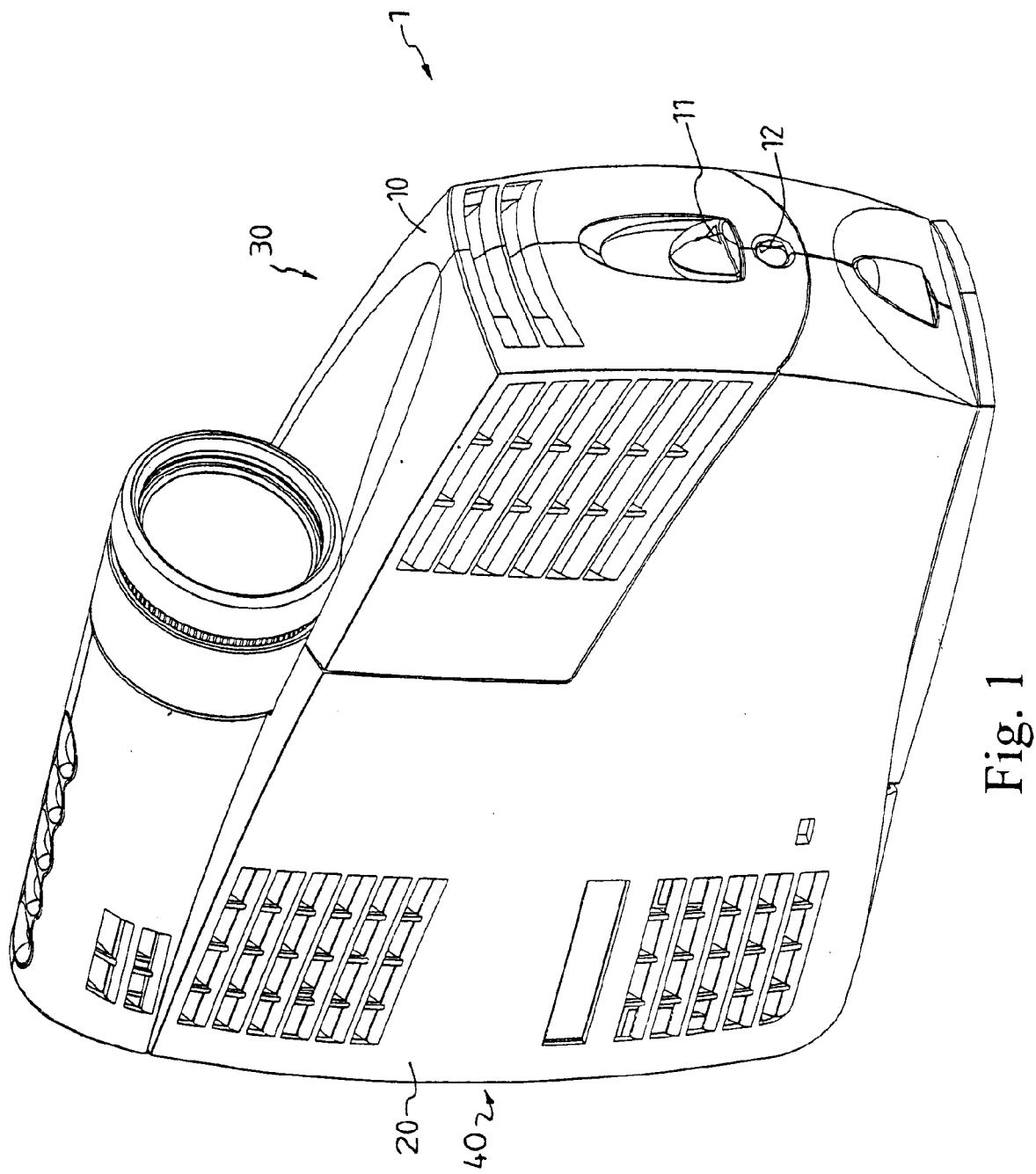
FIG. 1 depicts the structure appearance of the projector in the present invention having an easy-to-install lamp module.
Figure 4:
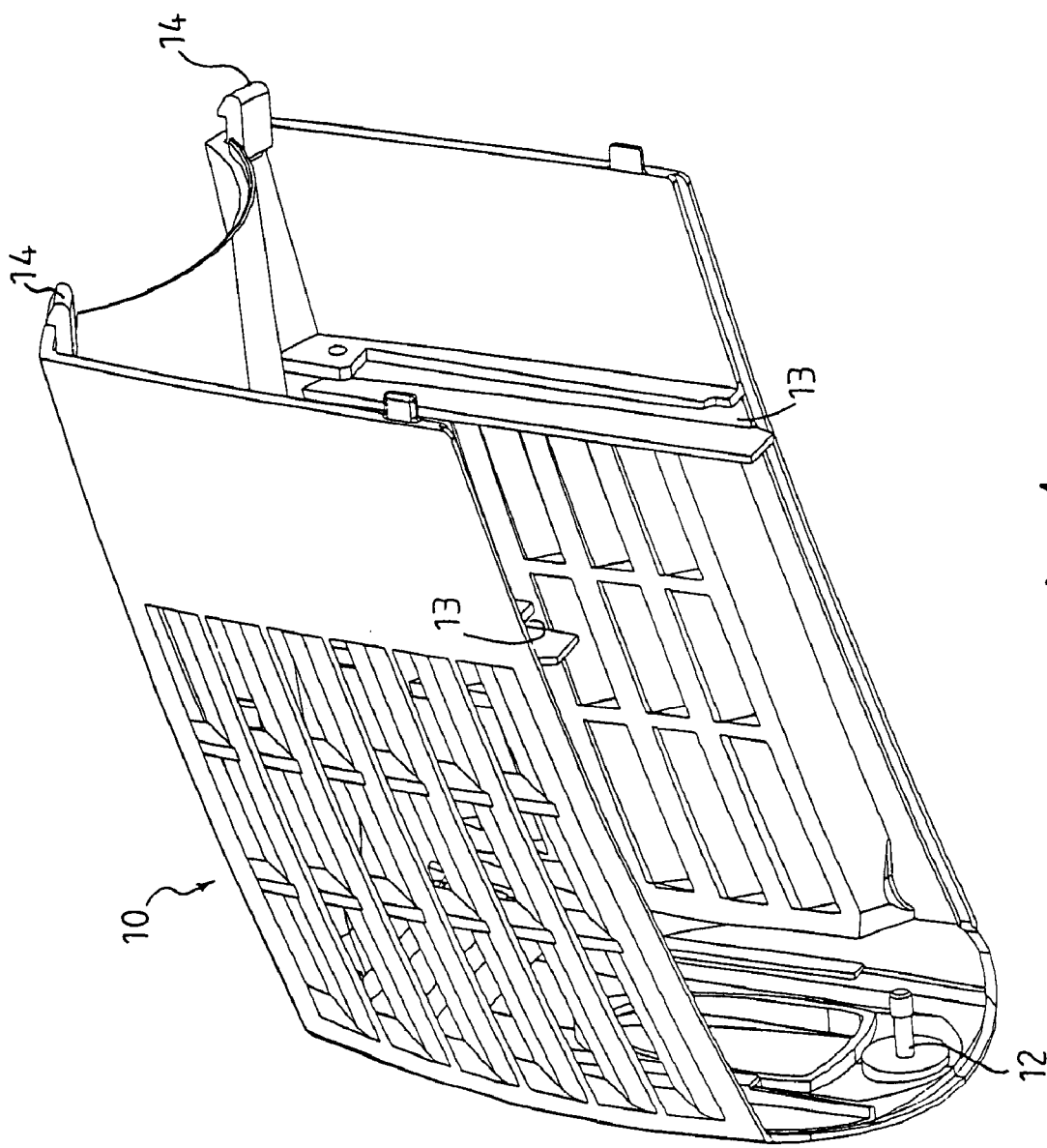
FIG. 4 depicts the structure of the lampshade.

FIG. 1 depicts a projector 1 of the invention having an easy-to-install lamp module 30 according to a preferred embodiment. The projector 1 comprises a first half housing 10, a second half housing 20, a lamp module 30, a projector mainframe 40 and a connector pair 50(not show in figure). The first half housing defines a space therein and the second half housing is detachably secured to the first half housing. Please refer to FIG. 4; the lamp module 30 is detachably positioned in the space defined by the first half housing 10. Further, a lampshade of the lamp module 30 is connected with the first half housing 10 and the lamp module 30. The projector mainframe 40 is secured within the second half housing 20. According to the preferred embodiment of the present invention, in mechanical and electrical simultaneously connection design, when a projector housing is constructed out of the first half housing 10 and the second half housing 20, the lamp module 30 is connected with the first half housing 10 is coupled with the projector housing 40 enclosed by the second half housing 20. However, in mechanical and electrical connection design, while the first half housing 10 is separated from the second half housing 20, the lamp module 30 connected with the first half housing 10 is decoupled from the projecting housing 40 enclosed by the second half housing 20. The coupling and decoupling in mechanical and electrical connection design will be described below in detail.

Figure 2:
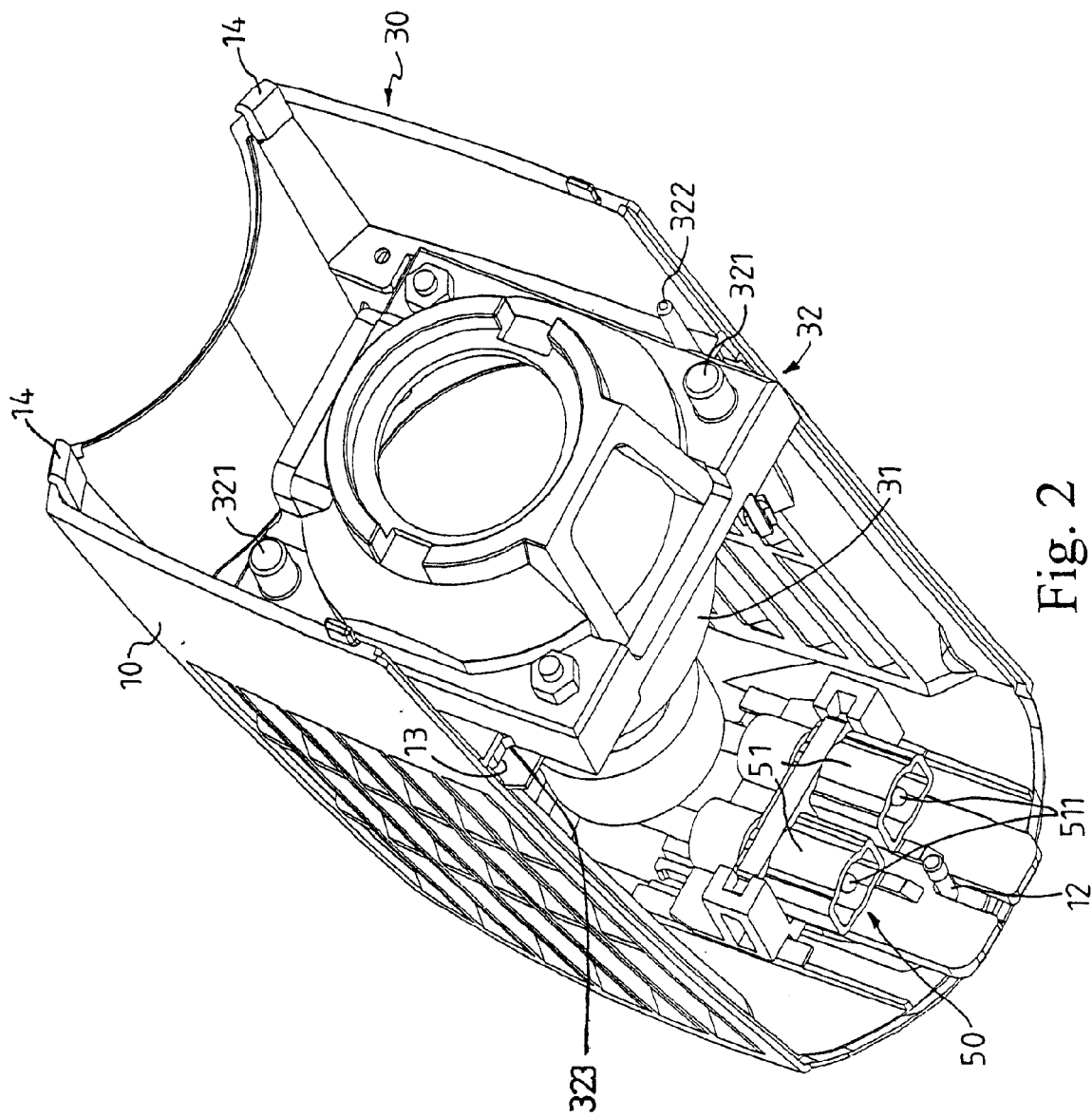
FIG. 2 depicts the structure of the lamp module fixed in a lampshade.
Figure 5:
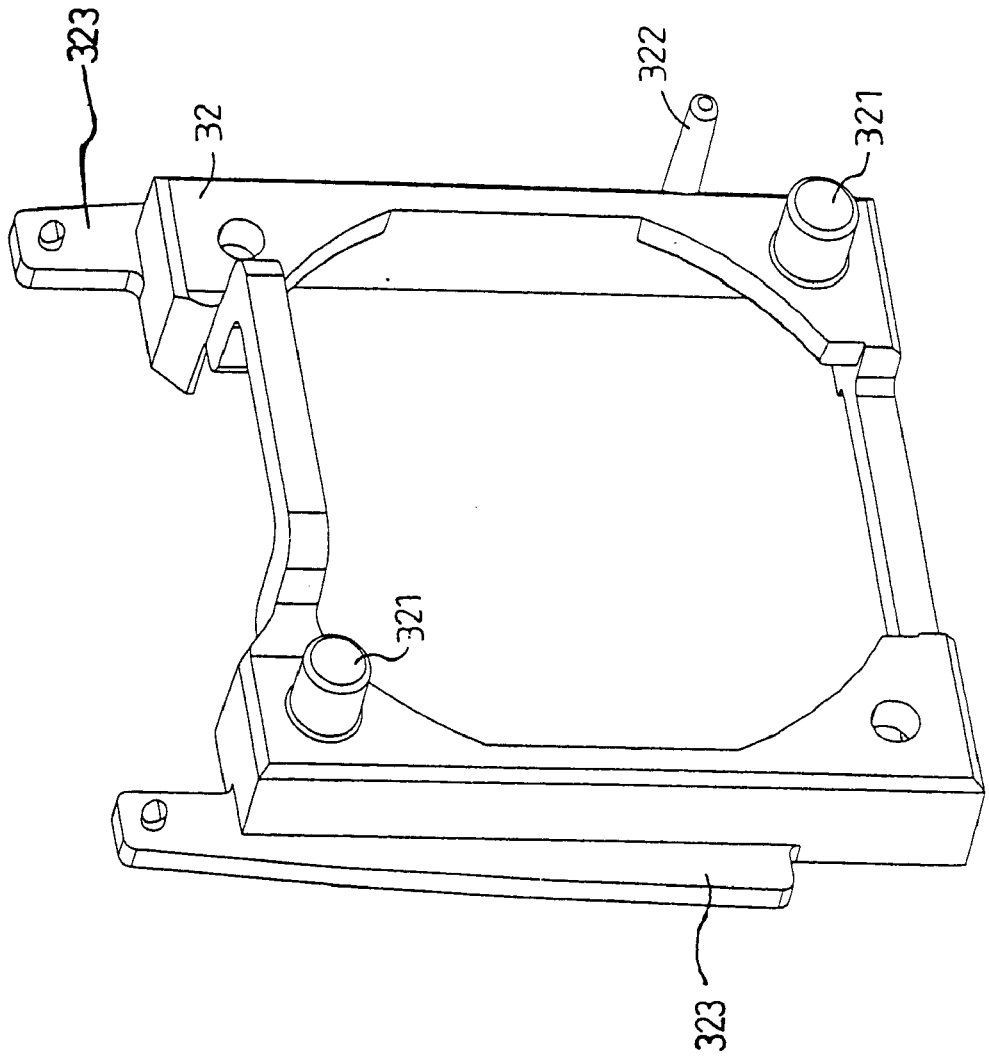
FIG. 5 depicts the structure of the lamp case.
Figure 6:
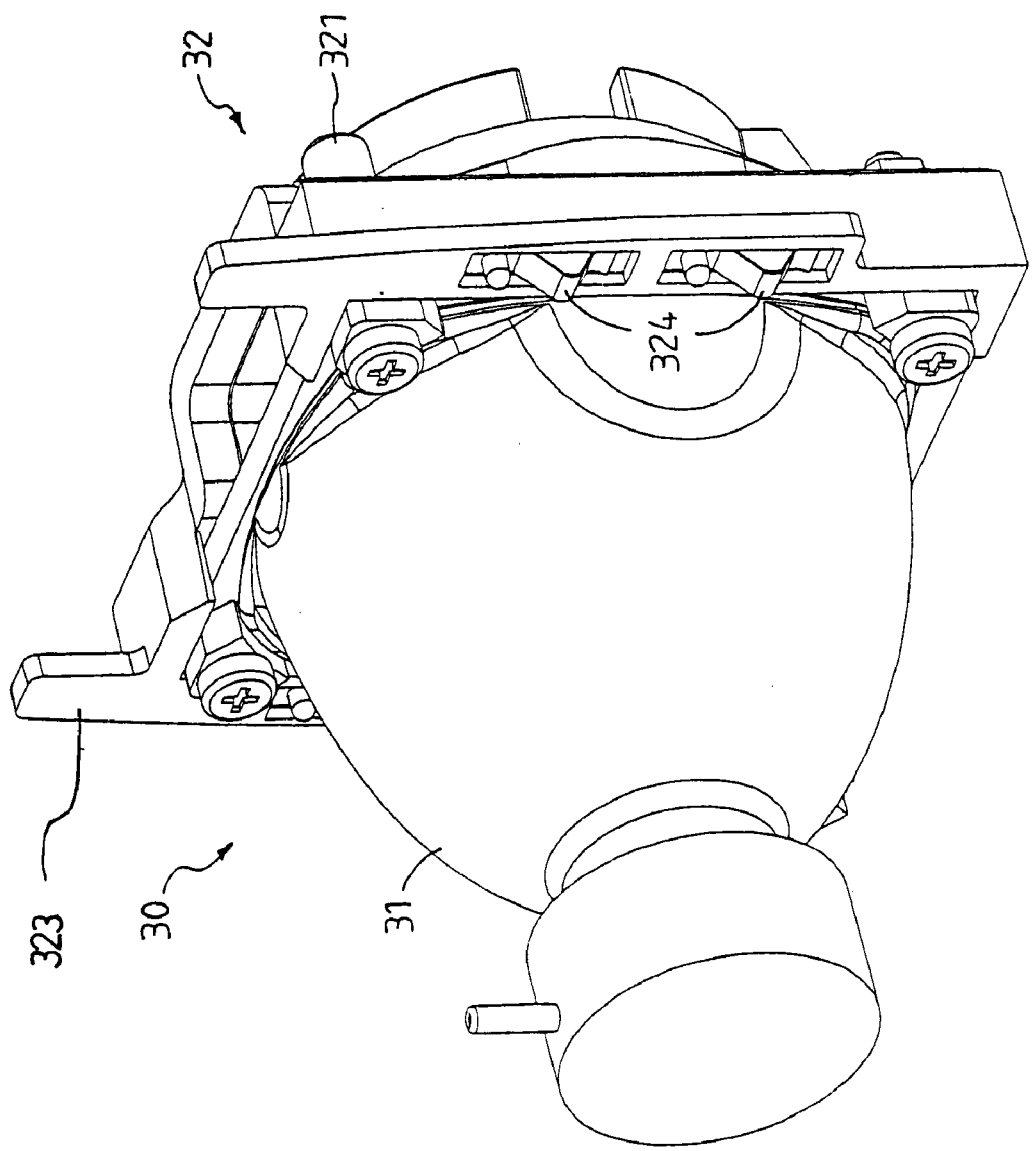
FIG. 6 depicts the figure combination of the lamp assembly and the lamp case.
Figure 7:
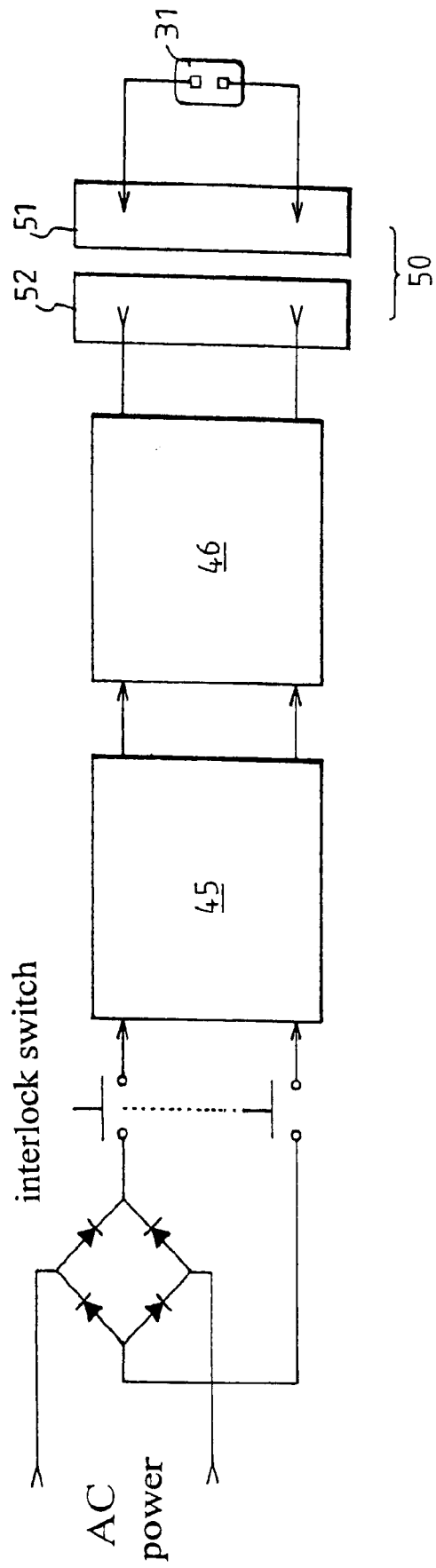
FIG. 7 depicts electric circuit diagram suitable for using in the projector of the present invention.

FIG. 2 depicts the structure of the lamp module 30 of the present invention fixed in the first half housing 10. The lamp module 30 have a lamp case 32 and a lamp assembly 31 framed in the lamp case 32. For example, the lamp assembly 31 is made by Osram Company of Germany. The periphery of head portion of the lamp assembly 31 is rectangular in order to fix the lamp assembly 31 by a securing means, such as a screw. The lamp case 32, shown in FIG. 5, is a rectangular framework, corresponding to the head portion of the lamp assembly 31 to take in the head portion of the lamp assembly 31, shown in FIG. 6. Moreover, the lamp case 32 has two case arms 323 opposed to each other and the first half housing 10 comprises two sliding grooves 13, shown in FIG. 4, formed therein for slidably receiving the case arms 323 of the lamp case 32 in order to position the lamp module 30, shown in FIG. 6. In one preferred embodiment of the present invention, the projector 1 further comprises a plurality of leaf springs 324 disposed on the case arms 323 of the lamp case 32 for functionally engaging the case arms 323 in the sliding grooves 13, shown in FIG. 6. While the case arm 323 is connected with the sliding groove 13, the leaf spring 324 is engaged with the case arm 323 to lock and position the lamp module 30. Therefore, the emission light of the lamp module 30 would be received by a photo-acceptance hole 43 of a photo-acceptance set 47 in the projector mainframe 40. In one preferred embodiment of the present invention, there is at least one engaging means 14 in the front of the first half housing 10 to facilitate the first half housing 10 to fittingly secure to the projector mainframe 40, shown in FIG. 3. The lamp case 32 comprise at least one positioning pin 321 and a actuating element 322, which are extending along with the light emission direction of the lamp assembly 31. Moreover, the projector mainframe 40 comprise at least one positioning hole 41 corresponding to the at lest one position pin 321 near the outer surface of a photo-acceptance set 47 in the projector mainframe 40, such that the lamp module 30 is precisely positioned with respected to the mainframe 40 when the first housing 10 is assembled with the second half housing 20 to insert the positioning pin into the positioning, shown in FIG. 3. The actuating element 322, for example a protruding pin, is disposed in the space defined by the first half housing 10. In one preferred embodiment of the present invention (please refer to FIG. 3 and FIG. 5), the positioning pin 321 and the positioning hole 41 are arranged diagonally and the lamp assembly 31 is positioned in same datum plane, such as X-Y datum plane. In addition, shown in FIG. 3, the lamp assembly 31 is positioned in another datum plane, such as Z datum plane, by several positioning blocks 44 near the outer surface of the photo-acceptance set 47. Although the position block 44 is of magnesium alloy material in the embodiment, other light, facile heat radiation and hard material could also be used. The projector mainframe 40 secured within the second half housing 20 for electrically operating the lamp assembly 31, the mainframe comprising a button switch 42 located in the second half housing and corresponding to the actuating element 322, shown in FIG.3, thereby electrically connecting an external power source (shown in FIG. 7) to the projector mainframe when the lamp module 30 is assembled with the projector mainframe 40 to have the actuating element 322 actuate the switch. Therefore, an electric circuit from external source through a lamp power supply 45 of the mainframe 40 to a lamp starter 46 would be got through. An interlock switch is constructed out of the actuating element 322 of the lamp case 32 and the button switch 42. The button switch 42 is a resilient push button which is actuated by the actuating element 322, for example a protruding pin, when the first half housing 10 is fully assemble with the second half housing 20. However, when the lamp module 30 is removed from the mainframe 40, the actuating element 322 can be separated from the button switch 42 and the circuit above-mention would be broken.

A connector pair 50 comprising a first half connector 51 and a second half 52 connector adapted to be coupled to the first half connector 51, shown in FIG. 2. The first half connector 51 being mounted in the first half housing 10 and electrically connected with the lamp module 30 and the second half connector 52 being mounted in the second half housing 20 and electrically connected with the projector mainframe 40. Operator would remove the first half housing 51 by use of a switch knob 11 which is disposed on the first half housing 10 to control the first half connector 51 mechanically disconnect to the second half connector 52. An electric circuit out of the lamp power supply 45 through the lamp starter 46 to lamp assembly 31 is constructed from the half connectors 51 and 52, shown in FIG. 7. The lamp assembly 31 will be connected electrically with the power supply 45 through a conductor 511 of the first connector and a conductor (not shown in FIG. 2) of the second half connector 52 to the projector mainframe 40 when the first half housing 10 is assembled with the second half housing 20 to have the first half connector 51 be electrically coupled to the second half connector 52. Moreover, the first half connector 51 of the projector 1 has a conductive plug (not shown in figure) and the second half connector 52 has a conductive socket (not shown in figure) which receives the conductive plug when the first half housing 10 is assembled with the second half housing 20. However, when the half connectors 51 and 52 are decoupled mechanically, the circuit between the power supply 45 and the lamp assembly 31 will be disconnected.

Figure 3:
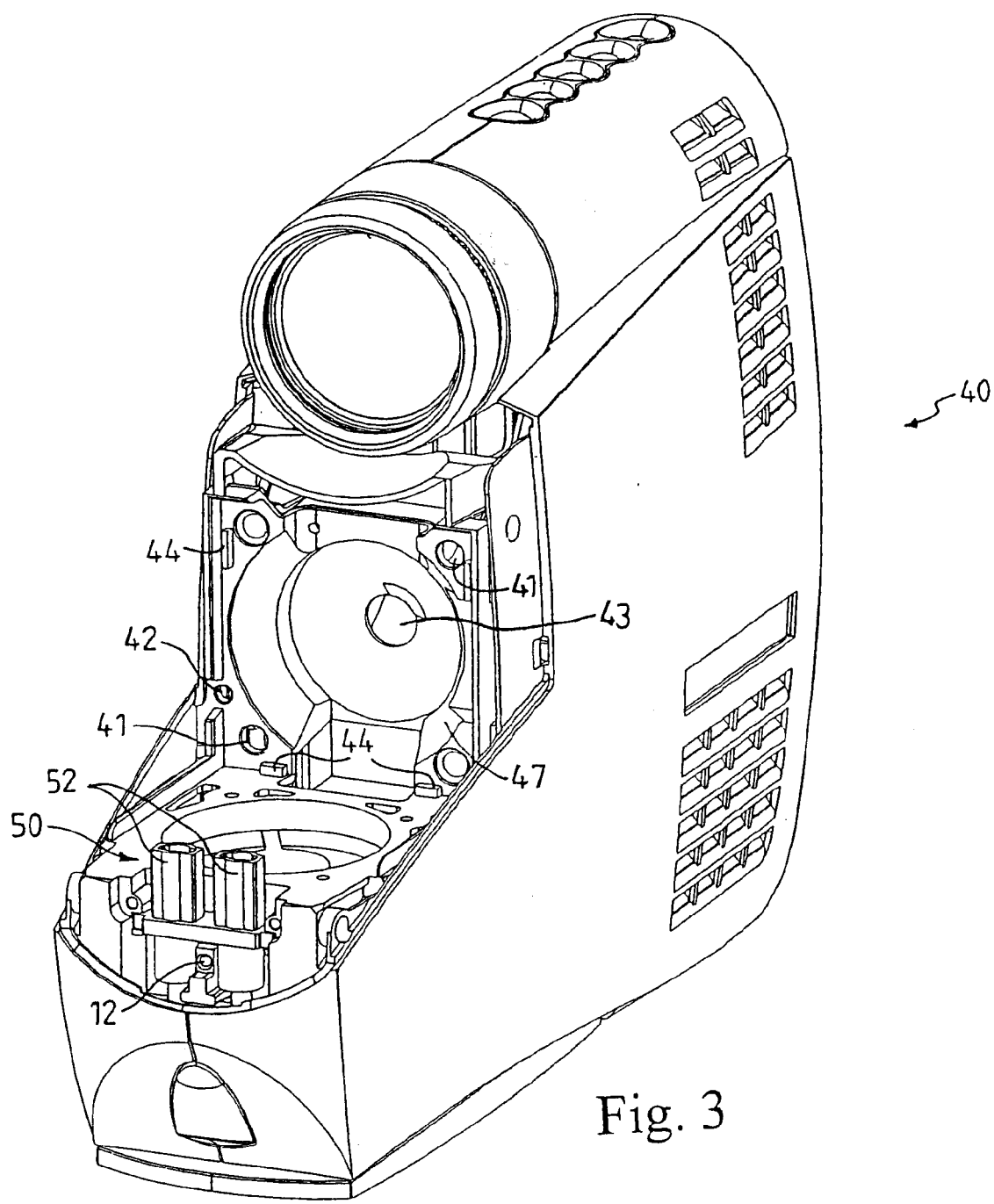
FIG. 3 depicts the structure of the projector mainframe after removing the lamp module from the projector, shown in FIG. 1.

FIG. 3 shows a portion of the inside structure of the projector mainframe 40 after the removing of the lamp module 30 from the projector 1. The steps of removing the lamp module 30 are described in detail in the following (please refer to the FIG. 1). First, operator has to disassemble a securing means 12 such as a screw, which is used to engage the first half housing 10 to the second half housing 20. Then, the switch knob 11 is to be pulled upward to remove the lamp module 30 from the projector mainframe 40 mechanically. Please notice that the securing means 12, shown in FIG. 1, should be set up in projector 1 to meet the safety requirement. Moreover, the first half connector 51 of the connector 50 is decoupled from the second half connector 52 mechanically, at the time as the switch knob 11 is pulled upward; and make the operator does not worry about the electrically shock. The actuating element 322 is separated from the button switch 42 and the power source circuit is broken at the time the lamp module 30 is removed. However, when the projector 1 is constituted from the lamp module 30 and the mainframe 40, the actuating element 322 would be contacted with the button switch 42 and the electricity of the mainframe 40 would be connected with the power source. As the first half connector 51 of the connector 50 is still not coupled with the second half connector 52 mechanically and electrically, the entire electric circuit of the projector 1 is disconnected. the operator will not get an electrical shock.

The present invention also discloses a method of safely assembling and disassembling the projector 1. The safely assembling method comprise the steps of:

(i) electrically connecting the external power source to the projector mainframe 40 by actuating the actuating element 322 of the first half housing 10 to operate the button switch 42 of the second half housing 20;

(ii) electrically connecting the lamp assembly 31 of the lamp module 30 mounted in the first half housing 10 to the projector mainframe 40 mounted in the second half housing by mechanically coupling the first half connector 51 to the second half connector 52; and (iii) fittingly fastening the first half housing 10 with the second half housing 20 by engaging the securing means 12.

However, the disassembling method comprises the steps of:

(i) unfastening the first half housing 10 with the second half housing 20 by disengaging the securing means 12;

(ii) electrically disconnecting the lamp assembly 31 of the lamp module 30 mounted in the first half housing 10 to the projector mainframe 40 mounted in the second half housing 20 by mechanically decoupling the first half connector 51 to the second half connector 52; and (iii) electrically disconnecting the external power source to the projector mainframe 40 by separating the actuating element 322 of the first half housing from the button switch 42 of the second half housing 20.

Any one of the steps mentioned above can prevent the operator from having an electrically shock by the projector 1 at a voltage greater than 10,000 volts. When the lamp module 30 of the present invention is decoupled mechanically, it can simultaneously be decoupled electrically. And the lamp module 30 is coupled mechanically; it can simultaneously be coupled electrically. However, as the lamp module 30 is connected with the first half housing 10, the operator will not get an electrical shock.

In conclusion, the advantages of the present invention are mentioned as the above. Although the present invention is described as a preferred embodiment, the preferred embodiment is to expose but not to limit the protective scope of the invention. The spirit of the present invention is defined in the following claim.

What is claimed is:

1. A projector, comprising:
    a projector housing, having a first half housing which defines a space therein, and a second half housing which is detachably secured to the first half housing;
    a lamp module, having a lamp case and a lamp assembly framed in the lamp case, the lamp module being detachably positioned in the space defined by the first half housing, said lamp module comprising an actuating element disposed in the space of the first half housing;
    a projector mainframe secured within the second half housing for electrically operating the lamp assembly, the mainframe comprising a switch located in the second half housing and corresponding to the actuating element, thereby electrically connecting an external power source to the projector mainframe when the lamp module is assembled with the projector mainframe to have the actuating element actuate the switch; and
    a connector pair comprising a first half connector and a second half connector adapted to be coupled to the first half connector, the first half connector being mounted in said first half housing and electrically connected with the lamp module, and the second half connector being mounted in the second half housing and electrically connected with the projector mainframe, thereby electrically connecting the lamp assembly to the projector mainframe when the first half housing is assembled with the second half housing to have the first half connector be electrically coupled to the second half connector.

2. The projector according to claim 1, wherein the actuating element is a protruding pin and the switch is a resilient push button which is actuated by the protruding pin when the first half housing is fully assembled with the second half housing.

3. The projector according to claim 1, wherein the first half connector has a conductive plug and the second half connector has a conductive socket which receives the conductive plug when the first half housing is assembled with the second half housing.

4. The projector according to claim 1, further comprising securing means, which engages the first half housing to the second half housing.

5. The projector according to claim 1, wherein the lamp case has two case arms opposed to each other and wherein the first half housing comprises two sliding grooves formed therein for slidably receiving the case arms of the lamp case in order to position the lamp module.

6. The projector according to claim 5, further comprises a plurality of leaf springs disposed on the case arms of the lamp case for frictionally engaging the case arms in the sliding grooves.

7. The projector according to claim 3, further comprising a switch knob disposed on the first half housing to control the first half connector mechanically disconnect to the second half connector.

8. The projector according to claim 1, wherein the first half housing further comprises at least one engaging means to facilitate the first housing to fittingly secure to the second half housing.

9. The projector according to claim 5, wherein the lamp case comprises at least one positioning pin, and the projector mainframe comprises at least one positioning hole corresponding to the at least one positioning pin such that the lamp module is precisely positioned with respect to the mainframe when the first half housing is assembled with the second half housing to insert the positioning pin into the positioning hole.

10. A method of safely assembling a projector according to claim 1, comprising the steps of:
   (i) electrically connecting the external power source to the projector mainframe by actuating the actuating element of the first half housing to operate the switch of the second half housing;
   (ii) electrically connecting the lamp assembly of the lamp module mounted in the first half housing to the projector mainframe mounted in the second half housing by mechanically coupling the first half connector to the second half connector; and
   (iii) fittingly fastening the first half housing with the second half housing by engaging the securing means.

11. A method of safely disassembling a projector according to claim 1, comprising the steps of:
   (i) unfastening the first half housing with the second half housing by disengaging the securing means;
   (ii) electrically disconnecting the lamp assembly of the lamp module mounted in the first half housing to the projector mainframe mounted in the second half housing by mechanically decoupling the first half connector to the second half connector; and
   (iii) electrically disconnecting the external power source to the projector mainframe by separating the actuating element of the first half housing from the switch of the second half housing.

* * * * *